United States Patent [19]
Dumain

[11] Patent Number: 6,093,774
[45] Date of Patent: Jul. 25, 2000

[54] LOW GLOSS POWDER COATING COMPOSITION

[75] Inventor: Eric Dumain, Chapell Hill, N.C.

[73] Assignee: Reichhold Chemicals, Inc., Research Triangle Park, N.C.

[21] Appl. No.: 08/938,136

[22] Filed: Sep. 26, 1997

[51] Int. Cl.$^7$ ................................................. C08L 35/00
[52] U.S. Cl. ........................ 525/207; 525/166; 525/187; 525/194
[58] Field of Search .................... 525/207, 194, 525/166, 187

[56] References Cited

U.S. PATENT DOCUMENTS

| | | | |
|---|---|---|---|
| 2,857,354 | 10/1958 | Fang et al. | 260/33.2 |
| 3,058,947 | 10/1962 | Fryling et al. | 260/43 |
| 3,758,632 | 9/1973 | Labana et al. | 260/836 |
| 3,781,379 | 12/1973 | Theodore et al. | 260/836 |
| 3,839,253 | 10/1974 | Kershaw et al. | 260/29.6 R |
| 3,842,035 | 10/1974 | Klaren | 260/47 EN |
| 3,888,943 | 6/1975 | Labana et al. | 260/836 |
| 3,939,127 | 2/1976 | Labana et al. | 525/207 |
| 4,069,275 | 1/1978 | Labana et al. | 260/836 |
| 4,072,656 | 2/1978 | Hartmann | 260/47 EN |
| 4,089,910 | 5/1978 | Shibata et al. | 260/836 |
| 4,091,049 | 5/1978 | Labana et al. | 260/836 |
| 4,092,373 | 5/1978 | Siwiec et al. | 260/830 R |
| 4,137,277 | 1/1979 | Nordstrom et al. | 260/835 |
| 4,189,421 | 2/1980 | Shay et al. | 260/38 |
| 4,242,253 | 12/1980 | Yallourakis | 260/40 TN |
| 4,312,795 | 1/1982 | Taguchi et al. | 260/18 R |
| 4,357,435 | 11/1982 | Lewis et al. | 524/239 |
| 4,388,448 | 6/1983 | Melby | 525/327.3 |
| 4,442,270 | 4/1984 | Passmore et al. | 525/440 |
| 4,499,239 | 2/1985 | Murakami et al. | 525/111 |
| 4,835,228 | 5/1989 | Hefner, Jr. et al. | 525/524 |
| 4,861,841 | 8/1989 | Marrion | 525/327.3 |
| 4,871,806 | 10/1989 | Shalati et al. | 525/108 |
| 4,937,288 | 6/1990 | Pettit, Jr. et al. | 525/176 |
| 5,008,335 | 4/1991 | Pettit, Jr. | 525/111 |
| 5,093,391 | 3/1992 | Barsotti et al. | 523/400 |
| 5,124,176 | 6/1992 | Marrion | 427/195 |
| 5,206,295 | 4/1993 | Harper et al. | 525/207 |
| 5,206,332 | 4/1993 | Hammer et al. | 528/118 |
| 5,212,243 | 5/1993 | Toyoda et al. | 525/187 |
| 5,326,821 | 7/1994 | Sasaki et al. | 525/124 |
| 5,407,706 | 4/1995 | Kano et al. | 427/386 |
| 5,407,707 | 4/1995 | Simeone et al. | 427/410 |
| 5,436,311 | 7/1995 | Hoebeke et al. | 525/174 |
| 5,491,202 | 2/1996 | Umehara et al. | 525/438 |
| 5,543,464 | 8/1996 | Decker et al. | 525/176 |
| 5,585,146 | 12/1996 | Uenaka et al. | 427/407.1 |
| 5,593,730 | 1/1997 | Satgurunathan et al. | 427/386 |
| 5,618,884 | 4/1997 | Cai et al. | 525/117 |
| 5,635,548 | 6/1997 | Kittle et al. | 523/220 |
| 5,648,117 | 7/1997 | Shiomi et al. | 427/195 |

FOREIGN PATENT DOCUMENTS

465176 A1  6/1991  European Pat. Off. .

*Primary Examiner*—Bernard Lipman
*Attorney, Agent, or Firm*—Myers, Bigel, Sibley & Sajovec, PA

[57] ABSTRACT

The present invention provides a low gloss powder coating composition comprising a glycidyl-containing acrylic polymer, a first acid functional crosslinking agent comprising a copolymer of an ethylenically unsaturated compound and an anhydride of a dicarboxylic acid and a second acid functional crosslinking agent comprising a dicarboxylic acid having 4 to 20 carbons.

8 Claims, No Drawings

LOW GLOSS POWDER COATING COMPOSITION

FIELD AND BACKGROUND OF THE INVENTION

This invention relates to a powder coating composition, and more particularly a powder coating composition that exhibits excellent resistance to degradation and has low gloss.

Powder coating compositions are now being used in a wide variety of painting techniques. They have become increasingly desirable, particularly in the automotive and truck industries, for various reasons including those related to ecology, health and safety. For example, powder coating compositions can reduce the amount of volatile solvents used as compared to liquid paints. After curing, typically using heat, only a very small amount, if any, of volatile solvent is given off to the environment.

Various powder coating compositions have been suggested. For example, a powder coating composition with excellent exterior durability can be prepared by reacting an acid group-containing acrylic polymer and a curing agent, triglycidyl isacyanurate (TGIC). Such coating compositions, however, often have poor stability and physical properties. Moreover, there is a concern about the environment impact of the use of TGIC.

U.S. Pat. No. 4,499,239 to Murakami et al. proposes a composition comprising 60 to 97 percent by weight of a linear polyester resin having an acid number of 15 to 200 mg KOH/g and 3 to 40 percent by weight of a glycidyl group-containing acrylic polymer, and optionally is modified with a monobasic acid such as methyl methacrylate. Powder coating compositions comprising a copolymer of glycidyl methacrylate, an ethylenically unsaturated compound, and a crosslinking agent formed in an anhydride of a dicerboxylic acid are proposed in U.S. Pat. Nos. 3,758,632, 3,781,379, 2,888,943 and 4,091,049 to Labana et al.

These compositions, however, tend to provide high gloss finishes. Powder coating compositions having a low gloss (matte) finish are becoming more desirable for use in automotive interiors, and for wheel rims, bumpers and the like. A common way to reduce gloss is to incorporate a filler such as talc or silica into the composition. It is believed that the gloss is lowered by the formation of minute surface irregularities on the coating. Another alternative is proposed in U.S. Pat. Nos. 5,436,311 and 5,525,370 to Hoebeke et al. which proposes a low gloss composition using a high percentage of methyl methacrylate in the composition. Other low gloss compositions are proposed in U.S. Pat. No. 4,242,253 to Yallourakis, and U.S. Pat. No. 5,491,202 to Umehara et al.

There, however, remains a need for a low gloss powder coating composition that has excellent resistance to degradation and eliminates the need for potentially hazardous modifiers or curing agents.

SUMMARY OF THE INVENTION

To this end, the present invention provides a low gloss powder coating composition comprising a glycidyl-containing acrylic polymer, a first acid functional crosslinking agent comprising a copolymer of an ethylenically unsaturated compound and an anhydride of a dicarboxylic acid and a second acid functional crosslinking agent comprising a dicarboxylic acid having 4 to 20 carbons. Although not wishing to be bound by one theory, Applicants believe that the differing reactivities of the first and second acid functional crosslinkers and the oxirane groups of the glycidyl-containing acrylic polymer synergistically result in a low gloss powder coating having excellent resistance to degradation. Moreover, the use of TGIC and the use of other potentially hazardous modifiers or curing agents are avoided.

In another embodiment, the present invention provides a powder coating composition comprising about 60 to 85 percent by weight of a glycidyl-containing acrylic polymer; about 5 to 30 percent by weight of a first acid functional crosslinking agent comprising a copolymer of an ethylenically unsaturated compound and an anhydride of a dicarboxylic acid; and about 3 to 15 percent by weight of a second acid functional crosslinking agent comprising a dicarboxylic acid having 4 to 20 carbons. Optionally, the powder coating composition may include a carboxylic group-containing polyester resin, and preferably the amount ranges from about 0.5 to 10 percent by weight.

DETAILED DESCRIPTION OF THE INVENTION

As detailed above, the powder coating composition of the present invention comprises a glycidyl-containing acrylic polymer, a first acid functional crosslinking agent comprising a copolymer of an ethylenically unsaturated compound and an anhydride of a dicarboxylic acid and a second acid functional crosslinking agent comprising a dicarboxylic acid having 4 to 20 carbons. The coating composition may be prepared using conventional techniques. Additives such as antistatic agents, degassing agents, catalysts, plasticizers and pigments may be included to achieve desired effects. The selection of such additives is within the skill of one in the art.

The glycidyl-containing acrylic polymer is a polymer or copolymer obtained by using (β-methyl)glycidyl (meth) acrylate as a starting material. The term "copolymer" as used herein means a polymer of two or more different monomers. The glycidyl-containing acrylic polymer is obtained in a customary manner, for example, from about 20 to 100% by weight, preferably about 40 to 80% by weight, of at least one (β-methyl)glycidyl (meth)acrylate selected from the group consisting of glycidyl acrylate, glycidyl methacrylate, β-methyl glycidyl acrylate and β-methyl glycidyl methacrylate. The remainder of the copolymer can be 0 to 80% by weight, preferably about 20 to 60% by weight, of another vinyl monomer. Typical examples of the other vinyl monomer which may be used as a comonomer to be reacted with (β-methyl)glycidyl (meth)acrylate are one or more of the following: styrene, (meth)acrylic acid esters (e.g., methyl methacrylate), fumaric acid diesters, acrylonitrile and acrylamide.

The glycidyl-containing acrylic polymer can also be modified with a monobasic acid, for example, by using 20 to 99% by weight, preferably 40 to 80% by weight, of at least one (β-methyl)glycidyl (meth)acrylate selected from glycidyl acrylate, glycidyl methacrylate, β-methyl glycidyl acrylate and β-methylglycidyl methacrylate, 0 to 60% by weight, preferably 20 to 50% by weight, of another vinyl monomer, and 1 to 20% by weight, preferably 2 to 10% by weight, of the monobasic acid. Examples of the monobasic acid are benzoic acid, p-tert-butylbenzoic acid, hydrogenated products of benzoic acids, caprylic acid, lauric acid, myristic acid, palmitic acid, stearic acid, arachic acid, behenic acid, lignoceric acid, and isomers thereof with branched alkyl groups. Polybasic acids which are esterified or etherified leaving only one carboxyl group may also be used as the monobasic acid. Modification of the glycidyl-containing acrylic polymer with a monobasic acid can be carried out as described in U.S. Pat. No. 4,499,239 to Murakami et al., the disclosure of which is incorporated herein in its entirety by reference.

The copolymers are prepared using conventional techniques known to those skilled in the art. Preferably the monomers are prepared by free radical polymerization in the presence of an initiator. Suitable free radical initiators include di-tertiary butyl peroxide, benzoyl peroxide, deconyl peroxide, azobisisobutyronitrile, and tertiary butyl peroctoate. The initiators are present in amounts of from about 0.1 to 5 percent.

Especially preferred as the (β-methyl)glycidyl (meth) acrylate is β-methylglycidyl methacrylate which is used either alone or in combination with glycidyl methacrylate.

For the purpose of this invention, the glycidyl-containing acrylic polymer preferably has a number average molecular weight of 300 to 5,000, preferably 500 to 3,000, and an epoxy equivalent of 130 to 2,000, preferably 200 to 1,000.

The first acid functional crosslinker comprises a copolymer of an ethylenically unsturated compound and an anhydride of a dicarboxylic acid. The ethylenically unsaturated compound include stryene, methylacrylic acid esters (e.g., methyl methacrylate, butyl methacrylate), fumeric acid diesters, acrylonitrile, and acrylamide. Suitable anydrides of a dicarboxylic acid include phthalic anhydride, p-chloro phthalic anydride, tetrabromo phthalic anhydride, cyclohexane 1,2-dicarboxylic anhydride, 4 methylhexane-1,2-dicarboxylic anhydride, cyclopentane-1,2-dicarboxylic anhydride, succinic anhydride, dodecyl succinic anhydride, maleic anhydride, methyl succinic anhydride, and polyazelaic anhydride. A preferred copolymer is styrene/maleic anhydride such as SMA 2625 A(1) available from Elf Atochem, Philadelphia, Pa. Another preferred copolymer is an anhydride modified polycarbonate available as DC-FA 1-4 available from Elf Atochem, Philadelphia, Pa. Preferably, from about 10 to 20 percent by weight of the first acid functional crosslinker is used.

The second acid functional crosslinking agent comprises a dicarboxylic acid having 4 to 20 carbon atoms. The powder coating composition comprises 10 to 20 percent by weight of the second acid functional crosslinking. Suitable dicarboxylic acids include dodecanedioic acid, sebacic acid, adipic acid, azaleic acid and succinic acid. A preferred dicarboxylic acid is dodecanedioic acid. The different reactivities of the first and second acid functional crosslinking agents and the oxirane groups of the glycidyl-containing acrylic polymers results in increased durability and low gloss due to the synergistic effect of the first and second crosslinking agents.

A powder coating composition having improved performance can optionally be obtained by the addition of a polyepoxy resin. The polyepoxy resin serves to improve the corrosion resistance and mechanical strength of the film, and denotes a resin having at least 2, preferably 2 to 3, epoxy groups per molecule and an epoxy equivalent of 80 to 2,000, preferably 100 to 1,000. Known epoxy resins may be used, and typical examples include diglycidyl ethers of bisphenols and glycidyl ester ethers of hydroxybenzoic acid; polyglycidyl ethers of polyhydric alcohol, such as ethylene glycol diglycidyl ether or trimethylol propane triglycidyl ether; glycidyl esters of dibasic acids, such as diglycidyl terephthalate; alicyclic polyepoxides such as diglycidyl ethers of hydrogenated bisphenols or (3,4-epoxy-6-methylcyclohexyl)methyl ester of 3,4-epoxy-6-methyl-cyclohexanecarboxylic acid; and triglycidyl isocyanurate. The amount of the polyepoxy resin is about 0.5 to 25 percent by weight, preferably 1 to 5 percent by weight, The polyepoxy resin suitably has a number average molecular weight of 300 to 5,000, preferably 500 to 3,000.

A carboxylic group-containing polyester resin may also be included. The starting acid and alcohol components thereof may be known conventional dibasic and polybasic acids, and dihydric and polyhydric alcohols, respectively. Typical examples of the acid component include terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, methylhexahydrophthalic acid, and the anhydrides thereof. Typical examples of the alcohol component include ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol. Monoepoxy compounds can also be used as one glycol component. The preferred number average molecular weight of the polyester resin is 1,000 to 10,000, preferably 2,000 to 5,000. The amount of the carboxy group-containing polyester resin is about 0.5 to 10 percent by weight. The average number of carboxyl groups per molecule of the polyester resin is from 1.2 to 3.0, preferably 1.5 to 1.9 for excellent film smoothness and gloss.

A flow control agent may be included in an amount of from about 0.1 to 5 percent by weight percent of the total powder composition. In general the flow control agent should be a polymer having a number average molecular weight of at least 1000 and a glass transition temperature at least 50° C. below the glass transition temperature of the compound copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($M_n$) above 1000, preferably about 5000 and most preferably between about 6000 and about 20,000. Among the preferred acrylic polymers useful as flow control agents are polylauryl acrylate, polybutyl acrylate, poly (2-ethylhexyl acrylate), polylauryl methacrylate and polyisodecyl methacrylate.

Although siloacrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2500 and perfluoro octanoic acid is a useful flow control agent. Polymeric siloxanes of molecular weight ($M_n$) over 1,000 advantageously 1,000 to 20,000, may also be useful as flow control agents, e.g., alkyl substituted silozanes such as polydimethyl siloxanes, and halogenated siloxanes such as poly 3,3,3-trifluoropropylmethyl silozane), poly(perfluorodimethyl siloxane, poly(pentafluorophenyl methyl siloxane), etc.

Since the powder coating compositions of the invention may be applied to articles by electrostatic spray techniques, the composition may include a small weight percent of an antistatic agent. In particular, the antistatic agent is included in a range of from about 0.05 to about 1.0 weight percent of the total powder composition. Suitable antistatic agents include, but are not limited to tetraalkyl ammonium salts as discussed previously and which also serve as catalysts. Other suitable antistatic agents include: alkyl poly (ethyleneoxy) phosphate or alkyllauryl poly (ethyleneoxy) phosphates such as ethyl benzyl poly ethyleneoxy) phosphate, polyethyleneimine, poly (2-vinyl pyrolidone), pyridinum chloride, poly (vinyl pyridimium chloride), polyvinyl alcohol, and inorganic salts.

A plasticizer may be used in the powder coating compositions of this invention if desired. The types of plasticizers used very often include adipates, phosphates, phthalates, secacates, polyesters derived from adipic acid or azelaic acid, and epoxy or epoxidized plasticizers. Exemplary of the many plasticizers which may be employed are: dihexyl adipate, diisooctyl adipate, dicyclohexyl adipate, triphenyl phosphate, tricresyl phosphate, tributyl phosphate, dibutylphthalate, dioctylphthalate, butyl octyl phthalate, dioctyl sebacate, butyl benzyl sebacate, dibenzyl sebacate, butanediol-1,4diglycidyi ether and cellulose acetate butyrate.

Pigments may be included in an amount of from 0.1 to 50 percent by weight. Suitable pigments include titanium dioxide, iron oxides, organic dyestuffs carbon black, etc. Metallic pigments such as aluminum may be included to provide a metallic appearance.

The powder coating composition may be applied by known coating methods such as electrostatic coating, electrostatic spray coating or fluidized coating. It may be applied to articles such as automotive exterior or interiors, appliance, lawn furniture, metal fixtures, and the like.

The coated film so prepared is baked by a conventional method to give a cured film having superior appearance represented by superior smoothness, low gloss and outstanding weatherability.

The following Examples illustrate the practice of the present invention. The Examples should not be construed as limiting the invention to anything less than that which is disclosed. Percents and parts are by weight unless otherwise indicated.

Gloss is expressed by the intensity of light reflected, in percent, with respect to the intensity of the incident light at an angle of 60° and 20°, and is measured according to ASTM D523. The surface appearance is characterized as acceptable if characterized as "smooth" or "mild orange peel". The process conditions are as follows:

Processing Conditions:

Premixing: Henschel FM-10 Premixer, residence time=60 seconds per batch

Melt-Mix Extrusion: Werner & Pfleiderer ZSK-30, Zone 1:100 C, Zone 2: 80 C, Screw Speed:250 RPM, Feed Rate: 60 lbs./hr.

Grinding: Brinkmann Retsch Mill, 15,000 RPM, 0.5 mm screen

Sieving: 140 mesh, Ro-Tap

Spray equipment: Nordson Versa-Spray 100, applied at −80 kV

EXAMPLES

The base glycidyl-containing acrylic resin ("GMA") is Fine-Clad® A-207SA available from Reichhold Chemical, Inc., Research Triangle Park, N.C. It is styrene/methymethacrylate/glycidyl methacrylate/n-butyl methacrylate/di-isobutyl fumarate.

The first crosslinking agent is styrene maleic anhydride copolymer ("SMA"). The second crosslinking agent is dodecanedioic acid ("DDDA"). The flow control agent is acrylate copolymer Modarez® 25321 available from Synthron, Inc., Morganton, N.C. The pigment is titanium dioxide ("$TiO_2$").

Example 1

| Component | Parts by Weight |
| --- | --- |
| GMA | 84.0 |
| SMA | 8.0 |
| DDDA | 8.0 |
| Flow Control Agent | 0.5 |
| $TiO_2$ | 25.0 |

The composition is formed into a film. The film had a mild orange peel appearance and a 60° gloss of 60 and a 20° gloss of 20.

Example 2

| Component | Parts by Weight |
| --- | --- |
| GMA | 84.0 |
| DDDA | 4.0 |
| SMA | 12.0 |
| Flow Control Agent | 0.5 |
| $TiO_2$ | 25.0 |

The composition is formed into a film. The film has a smooth appearance, and a 60° gloss of 38 and a 20° gloss of 8.

Example 3

| Component | Parts by Weight |
| --- | --- |
| GMA | 84.0 |
| SMA | 12.0 |
| DDDA | 8.0 |
| Flow Control Agent | 0.5 |
| $TiO_2$ | 25.0 |

The composition is formed into a film. The film has a mild orange peel appearance and a 60° gloss of 52 and a 20° gloss of 15.

Example 4

| Component | Parts by Weight |
| --- | --- |
| GMA | 84.0 |
| SMA | 24.0 |
| DDDA | 8.0 |
| Flow Control Agent | 0.5 |
| $TiO_2$ | 25.0 |

The composition is formed into a film. The film has a smooth appearance and a 60° gloss of 36 and a 20° gloss of 7.

Example 5

| Component | Parts by Weight |
| --- | --- |
| GMA | 84.0 |
| SMA | 36.0 |
| DDDA | 8.0 |
| Flow Control Agent | 0.5 |
| TiO$_2$ | 25.0 |

The composition is formed into a film. The film has a smooth appearance and a 60° gloss of 29 and a 20° gloss of 5.

Example 6

| Component | Parts by Weight |
| --- | --- |
| GMA | 84.0 |
| SMA | 0 |
| DDDA | 8.0 |
| Flow Control Agent | 0.5 |
| TiO$_2$ | 25.0 |

The composition is formed into a film. The film has a mild orange peel appearance and a 60° gloss of 73 and a 20° gloss of 34.

Example 7

| Component | Parts by Weight |
| --- | --- |
| GMA | 84.0 |
| SMA | 24.0 |
| DDDA | 8.0 |
| Flow Control Agent | 2.5 |
| TiO$_2$ | 25.0 |
| Benzoin[1] | 0.5 |

[1]Degassing agent

The composition is formed into a film and had an initial 60° gloss of 37. The percent gloss retention was 67% after 900 hours.

In the specification and examples, there have been disclosed preferred embodiments of the invention. Although specific terms are employed in these examples, they are used in a generic and descriptive sense only and not for the purpose of limitation, the scope of the invention being defined by the following claims.

That which is claimed:

1. A powder coating composition comprising:
   60 to 80 percent by weight of a glycidyl-containing acrylic polyer;
   5 to 30 percent by weight of a first acid functional crosslinking agent comprising a copolymer of an ethylenically unsaturated compound and an anhydride of a dicarboxylic acid; and
   5 to 15 percent by weight of a second acid functional crosslinking agent comprising a dicarboxylic acid having 4 to 20 carbons.

2. The powder coating composition according to claim 1 wherein the first acid functional crosslinking agent is styrene/maleic anhydride copolymer.

3. The powder coating composition according to claim 1 wherein the second acid functional crosslinking agent is dodecanedioic acid.

4. The powder coating composition according to claim 1, wherein the glycidyl-containing acrylic polymer is modified with 1 to 20 percent by weight of the glycidyl-containing acrylic polymer of a monobasic acid.

5. The powder coating composition according to claim 4, wherein the monobasic acid is methyl methacrylate.

6. The powder coating composition according to claim 1, further including 0.5 to 10 percent by weight of a carboxylic group-containing polyester resin.

7. The powder coating composition according to claim 1, further including 0.5 to 25 percent by weight of a polyepoxy resin.

8. An article coated with the polymer coating composition of claim 1.

* * * * *